Dec. 25, 1962 A. J. MARKO 3,070,702

ELECTROLUMINESCENT ARITHMETIC CIRCUIT

Filed July 15, 1960

INVENTOR
ALBERT J. MARKO
BY Theodore Jay Jr
ATTORNEY

United States Patent Office 3,070,702

Patented Dec. 25, 1962

3,070,702

ELECTROLUMINESCENT ARITHMETIC CIRCUIT

Albert J. Marko, Deer Park, N.Y., assignor to General Telephone and Electronics Laboratories, Inc., a corporation of Delaware Filed July 15, 1960, Ser. No. 43,200
7 Claims. (Cl. 250—213)

My invention relates to arithmetic circuits.

Arithmetic circuits are designed to perform arithmetic operations as for example addition, subtraction, multiplication and division. I have invented a new type of arithmetic circuit capable of carrying out the above identified operations without the use of any active circuit components such as tubes or transistors.

Accordingly it is an object of my invention to provide a new type of arithmetic circuit of the character indicated.

Another object is to provide a new type of arithmetic circuit utilizing combinations of electroluminescent and photoconductive cells.

Still another object is to provide a new type of arithmetic circuit having a plurality of circuit paths and adapted to process two numbers, the impedance levels of said path uniquely specifying the sum, product, remainder or quotient of these numbers.

These and other objects of my invention will either be explained or will become apparent hereinafter.

In accordance with my invention I provide a first set of electroluminescent cells and a first group of photoconductive cells. The number of cells in the first set is equal to the number of cells in the first group. Each photoconductive cell in the first group is optically coupled to the corresponding electroluminescent cell in the first set. One end of each of the first group cells is connected to a common terminal.

I further provide a plurality of photoconductive means equal in number to the number of cells in the first set. Each photoconductive means includes a different plurality of photoconductive elements. One end of each of the elements in any photoconductive means is connected in common to the other end of the first group cell corresponding to this photoconductive means. The other end of each element is connected to a corresponding output terminal thus establishing parallel circuit paths between the common terminal and each of the output terminals.

In addition, I provide a second set of electroluminescent cells equal in number to the plurality of photoconductive means. Corresponding elements in each of said photoconductive means are optically coupled to the corresponding cell in the second set.

Each electroluminescent cell, when electrically energized, emits light, the photoconductive cell or photoconductive elements optically coupled to the energized cell being triggered from a high impedance state to a low impedance state. Upon the cessation of light or in the absence of light, the impedance level of the photoconductive cell or photoconductive elements remains high.

A different number is assigned to each electroluminescent cell in the first set and to each electroluminescent cell in the second set. A different number is assigned to each of the output terminals. Depending upon the type of arithmetic operation desired, each of the terminal numbers represents the sum, product, remainder or quotient of the two numbers assigned to the first and second set electroluminescent cells associated with each path. In order to perform the operation, a selected cell in each of the two sets is energized. As a consequence, a selected one of the circuit paths will have a low impedance level while all other circuit paths will have high impedance levels. The number assigned to the output terminal of the selected path will then be the sum, product, remainder or quotient of the two numbers assigned to the two selected cells.

An illustrative embodiment of my invention will now be described with reference to the accompanying drawings wherein.

Figure 1:
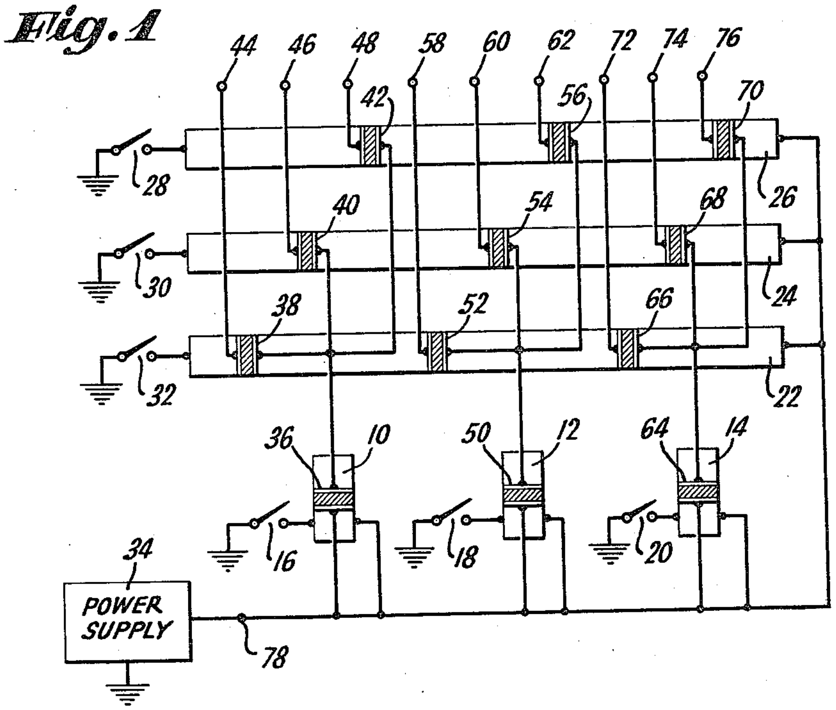
FIG. 1 is a block diagram of an embodiment of my invention.

Referring now to FIG. 1 there is shown a first set of electroluminescent cells, in this example, cells 10, 12 and 14. Each of these cells is connected in series with the corresponding one of switches 16, 18 and 20 across the terminals of power supply 34. When any of these switches is closed, the corresponding electroluminescent cell is energized and emits light. When this switch is opened, the corresponding electroluminescent cell is deenergized and dark.

There is further provided a second set of electroluminescent cells, in this example, electroluminescent cells 22, 24 and 26. Each of cells 22, 24 and 26 is connected in series with the corresponding one of switches 28, 30 and 32 across the terminals of power supply 34. This second set of electroluminescent cells operates in the same fashion as the first set of electroluminescent cells.

I further provide a first group of photoconductive cells, in this example, photoconductive cells 36, 50 and 64 which are electrically isolated from, but optically coupled to, a corresponding one of the first set of electroluminescent cells 10, 12 and 14. One contact of each photoconductive cell 36, 50 and 64 is coupled in common to terminal 78 of power supply 34. With each of photoconductive cells 36, 50 and 64 is associated a separate photoconductive means. Each photoconductive means includes a plurality of photoconductive elements. (In this example each means includes three photoconductive elements.) More particularly, the photoconductive means associated with photoconductive cell 36 includes photoconductive elements 38, 40 and 42. These photoconductive elements (which are actually photoconductive cells) have one contact connected in common to the side of photoconductive cell 36 which is remote from the power supply. The other contacts of each of these photoconductive elements are coupled to corresponding output terminals 44, 46 and 48 respectively. The photoconductive means associated with photoconductive cell 50 includes photoconductive elements 52, 54 and 56 which are connected to corresponding output terminals 58, 60 and 62 and are also connected in common to photoconductive cell 50. Similarly, photoconductive elements 66, 68 and 70 are connected in common to photoconductive cell 64 and are also individually connected to terminals 72, 74 and 76 respectively. Photoconductive elements 38, 52 and 66 are electrically isolated from, but optically coupled to, electroluminescent cell 22. Photoconductive elements 40, 54 and 68 are electrically isolated from, but optically coupled to, electroluminescent cell 24; and photoconductive elements 42, 56 and 70 are electrically isolated from, but optically coupled to, electroluminescent cell 26.

Each of the photoconductive cells and photoconductive elements has an electrical characteristic at which, when the associated electroluminescent cell is dark, the photoconductive element or cell represents a high impedance. When the electroluminescent cell is lit, the corresponding photoconductive cell or element is triggered to a low impedance state.

When all electroluminescent cells are dark, each of the output terminals is connected through high impedance photoconductive cells and elements to the power supply, thus forming a plurality of parallel high impedance circuit paths. When any one of switches 28, 30 and 32 is closed, the appropriate photoconductive elements are triggered into the low impedance state. However, the impedances of photoconductive cells 36, 50 and 64 remain high and, as a result, each of the output terminals is still connected through a high impedance path to the power supply. However, if now one of switches 16, 18 and 20 is closed, its associated photoconductive cell will be triggered into its low impedance state and one selected output terminal will be connected to the power supply through a low impedance path, while all other impedance paths remain high. Specifically, for example, if switches 28 and 16 are closed, a low impedance is established between output terminal 48 and power supply terminal 78, while all other paths to this terminal 78 and any of the other output terminals remain a high impedance path. Thus, by closing a selected one of switches 28, 30 and 32 and at the same time closing a selected one of switches 16, 18 and 20, any selected one of the circuit impedance paths can be switched to a low impedance state while all other circuit paths remain at a high impedance state.

The arrangement described above can be used to perform arithmetic operations. For example, if particular numbers are assigned to each of the electroluminescent cells and the output terminals, any selected multiplication, division, subtraction or addition operation can be carried out. To use the embodiment of FIG. 1 for multiplication, for example, numbers 1, 2 and 3 can be assigned to electroluminescent cells 10, 12 and 14 respectively. Similarly, numbers 1, 2 and 3 can be assigned to electroluminescent cells 22, 24 and 26 respectively. Then numbers 1, 2 and 3 can be assigned to the respective output terminals 44, 46 and 48, while numbers 2, 4 and 6 are assigned to output terminals 58, 60 and 62 and numbers 3, 6 and 9 are assigned to output terminals 72, 74 and 76, respectively. Multiplication is then carried out in the following manner. By closing one of switches 16, 18 and 20 and one of switches 28, 30 and 32, the product of the numbers represented by the electroluminescent cells controlled by these switches will be represented by the output terminal coupled to the circuit path of low impedance. For example, if switches 30 and 20 are closed (representing numbers 2 and 3 respectively), the circuit path between terminals 74 and 78 will be a low impedance path and the number (6) associated with terminal 74 represents the product of the numbers.

By assigning different numbers to the various output terminals, it will be apparent that any arithmetic computation of the type indicated above can be carried out. For example, if the numbers 1, 2, . . . 9 are assigned to terminals 44, 46, . . . 76, then the embodiment can be used for addition.

Further, when the numbers associated with the first set of electroluminescent cells represent the subtrahends, then the subtraction operation can be performed if the numbers 0, 1, 2, −1, 0, 1, −2, 1 and 0 are assigned to terminals 44, 46, 48, 58, 60, 62, 72, 74 and 76 respectively.

However, when the numbers associated with the first set of electroluminescent cells represent the divisor and the numbers associated with the second set of electroluminescent cells represent the dividends, then the division operation can be performed if the numbers 1, 2, 3, ½, 1, 1½, ⅓, ⅔ and 1 are assigned to terminals 44, 46, 48, 58, 60, 62, 72, 74 and 76 respectively.

Obviously the numbers assigned to the electroluminescent cells and output terminals can be varied as required. Further, a plurality of the embodiments of FIG. 1 can be used and connected in cascade, as for example, to represent decades, hundreds and thousands in the decimal scale. Moreover, the number of electroluminescent cells in the first set can differ from the number of electroluminescent cells in the second set, and the number of photoconductive elements used by each photoconductive means can be varied as desired.

Figure 2:
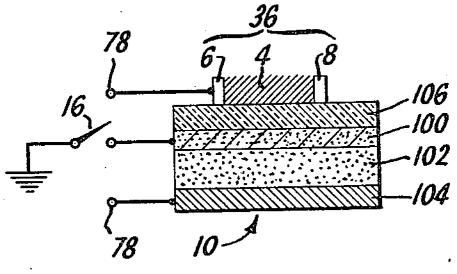
FIG. 2 is a cross sectional view of one of the first set of electroluminescent cells of FIG. 1 together with its electrical connections.

FIG. 2 shows a cross sectional view of a typical one of electroluminescent cells 16, 18 and 20 together with an associated photoconductive cell, switch, and various electrical connections. It will be seen that the electroluminescent cell is of a conventional type having an electroluminescent layer 102 subtended between a bottom electrode 104 and a top transparent electrode 100. The photoconductive cell is of the so-called gap type with a cadmium sulfide layer interposed between two horizontally spaced electrodes. The photoconductive cell is electrically isolated from the electroluminescent cell by means of a transparent insulating film 106.

Figure 3:
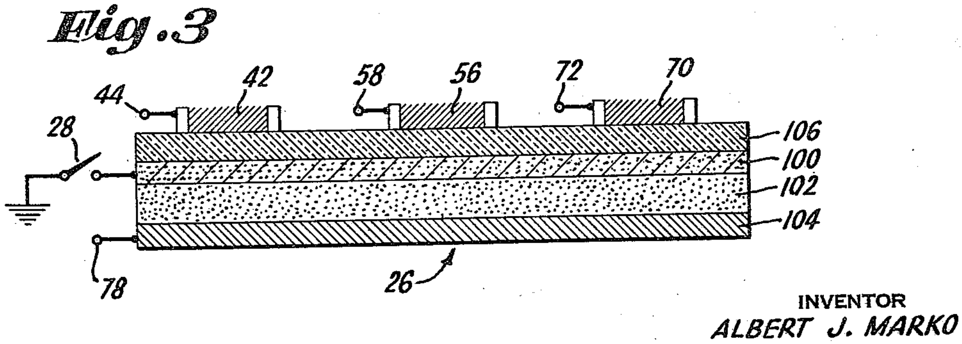
FIG. 3 is a cross sectional view of one of the second set of electroluminescent cells of FIG. 1 together with its electrical connections.

FIG. 3 shows a corresponding cross sectional view of any one of electroluminescent cells 22, 24 and 26. It is constructed in the same manner as the cell of FIG. 2 except that three photoconductive elements are associated with it (as contrasted to the one photoconductive cell associated with each of the electroluminescent cells of FIG. 2). It will be noted that the photoconductive elements and the photoconductive cells are complete equivalents, being constructed in the same manner and having equivalent optical and electrical characteristics.

What is claimed is:

1. A device comprising a first set of electroluminescent cells; a first group of photoconductive cells, the number of cells in said first set being equal to the number of cells in the first group, each photoconductive cell in the first group being optically coupled to the corresponding electroluminescent cell in said first set; a plurality of photoconductive means, the number of said means being equal to the number of cells in said first set, each photoconductive means including another plurality of photoconductive elements, the elements of each means being electrically connected in common to the corresponding photoconductive cell in said first group, and a second set of electroluminescent cells, the number of cells in said second set being equal to said another plurality, corresponding elements in each of said means being optically coupled in common to the corresponding cell in said second set.

2. A device comprising a first set of M different electroluminescent cells; a first group of M different photoconductive cells, each photoconductive cell being optically coupled to the corresponding first set cell; M different photoconductive means, each means including N different photoconductive elements, one end of each of the elements of each means being electrically connected in common to the corresponding first group cell; and a second set of N different electroluminescent cells, corresponding elements in each of said means being optically coupled in common to the corresponding second set cell.

3. A device comprising a first set of M different electroluminescent cells; a first group of M different photoconductive cells, each photoconductive cell being optically coupled to the corresponding first set cell, one contact of each of said photoconductive cells being connected to a common terminal; M different photoconductive means, each means including N different photoconductive elements, one contact of each of the elements of each means being connected in common to the other contact of the corresponding first group cell; and a second set of N different electroluminescent cells, corresponding elements in each of said means being optically coupled in common to the corresponding second set cell.

4. A device comprising a first set of M different electroluminescent cells; a first group of M different photoconductive cells, each photoconductive cell being optically coupled to the corresponding first set cell, one contact of each of said photoconductive cells being connected to a common terminal; M different photoconductive means, each means including N different photoconductive elements, one contact of each of the elements of each means being connected in common to the other end of the corresponding first group cell; a second set of N different electroluminescent cells, corresponding elements in each of said means being optically coupled in common to the corresponding second set cell; and MN different output terminals, each output terminal being connected to the other contact of the corresponding photoconductive element whereby MN different circuit paths are established between said common terminal and said output terminals.

5. A device comprising a first set of M different electroluminescent cells; a first group of M different photoconductive cells, each photoconductive cell being optically coupled to the corresponding first set cell, one contact of each of said photoconductive cells being connected to a common terminal; M different photoconductive means, each means including N different photoconductive elements, one contact of each of the elements of each means being connected in common to the other end of the corresponding first group cell; a second set of N different electroluminescent cells, corresponding elements in each of said means being optically coupled in common to the corresponding second set cell; MN different output terminals, each output terminal being connected to the other contact of the corresponding photoconductive element whereby MN different circuit paths are established between said common terminal and said output terminals; and means to selectively energize one first set cell and one second set cell whereby one selected circuit path is a low impedance path, the selection being determined by the particular first and second set cells energized.

6. A device comprising a first set of M different electroluminescent cells; a first group of M different photoconductive cells, each photoconductive cell being optically coupled to the corresponding first set cell, one contact of each of said photoconductive cells being connected to a common terminal; M different photoconductive means, each means including N different photoconductive elements, one contact of each of the elements of each means being connected in common to the other end of the corresponding first group cell; a second set of N different electroluminescent cells, corresponding elements in each of said means being optically coupled in common to the corresponding second set cell; MN different output terminals, each output terminal being connected to the other contact of the corresponding photoconductive element whereby MN different circuit paths are established between said common terminal and said output terminals; a power supply coupled between said common terminal and another terminal, said another terminal providing a reference potential with respect to said output terminals; and means coupled to said power supply to selectively energize one first set cell and one second set cell whereby one selected circuit path is a low impedance path and all unselected circuit paths are high impedance paths, the selection being determined by the particular first and second set cells energized.

7. A device comprising a first set of M different electroluminescent cells, each first set cell being associated with a number selected from a first set of numbers; a first group of M different photoconductive cells, each photoconductive cell being optically coupled to the corresponding first set cell, one end of each of said photoconductive cells being connected to a common terminal; M different photoconductive means, each means including N different photoconductive elements, one end of each of the elements of each means being connected in common to the other end of the corresponding first group cell; a second set of N different electroluminescent cells, corresponding elements in each of said means being optically coupled in common to the corresponding second set cell, each second set cell being associated with a number selected from a second set of numbers; and MN different output terminals, each output terminal being connected to the other end of the corresponding photoconductive element whereby MN different circuit paths are established between said common terminal and said output terminals, each output terminal being associated with a number selected from a third set of numbers, the number associated with any output terminal bearing a predetermined relation to the two numbers associated with the particular first and second set cells optically coupled to the photoconductive cell and photoconductive element included in the circuit path which includes said any terminal.

References Cited in the file of this patent

UNITED STATES PATENTS 2,907,001 Loebner ---------------- Sept. 29, 1959